US008261193B1

(12) United States Patent
Alur et al.

(10) Patent No.: US 8,261,193 B1
(45) Date of Patent: Sep. 4, 2012

(54) METHOD AND SYSTEM FOR CAPTURING MASHUP DATA FOR COLLECTIVE INTELLIGENCE AND USER-GENERATED KNOWLEDGE

(75) Inventors: Deepak Alur, Fremont, CA (US); Kishore Subramanian, Sunnyvale, CA (US); Rajmohan Krishnamurthy, Walnut Creek, CA (US)

(73) Assignee: JackBe Corporation, Chevy Chase, MD (US)

( * ) Notice: Subject to any disclaimer, the term of this patent is extended or adjusted under 35 U.S.C. 154(b) by 193 days.

(21) Appl. No.: 12/763,724

(22) Filed: Apr. 20, 2010

Related U.S. Application Data

(60) Provisional application No. 61/171,379, filed on Apr. 21, 2009.

(51) Int. Cl.
*G06F 3/048* (2006.01)
(52) U.S. Cl. ........................................ 715/742; 715/810
(58) Field of Classification Search .................. 715/742, 715/810, 744
See application file for complete search history.

(56) References Cited

U.S. PATENT DOCUMENTS

| | | | | |
|---|---|---|---|---|
| 6,119,135 | A * | 9/2000 | Helfman | 715/206 |
| 6,674,447 | B1 * | 1/2004 | Chiang et al. | 715/704 |
| 6,684,207 | B1 | 1/2004 | Greenfield et al. | |
| 7,149,982 | B1 * | 12/2006 | Duperrouzel et al. | 715/788 |
| 7,434,229 | B2 | 10/2008 | Barinov et al. | |
| 7,536,413 | B1 | 5/2009 | Mohan et al. | |
| 7,788,251 | B2 | 8/2010 | Carlson et al. | |
| 7,831,559 | B1 | 11/2010 | Mohan et al. | |
| 7,904,818 | B2 * | 3/2011 | Lauridsen et al. | 715/742 |
| 2001/0028368 | A1 * | 10/2001 | Swartz et al. | 345/835 |
| 2003/0117437 | A1 | 6/2003 | Cook et al. | |
| 2003/0197726 | A1 | 10/2003 | Weitzman | |
| 2004/0183831 | A1 | 9/2004 | Ritchy et al. | |
| 2004/0221296 | A1 * | 11/2004 | Ogielski et al. | 719/313 |
| 2005/0278323 | A1 | 12/2005 | Horvitz et al. | |
| 2007/0067722 | A1 | 3/2007 | Ames et al. | |
| 2007/0112955 | A1 | 5/2007 | Clemm et al. | |
| 2007/0240063 | A1 | 10/2007 | Cheng et al. | |
| 2007/0282673 | A1 | 12/2007 | Nagpal et al. | |
| 2009/0157728 | A1 | 6/2009 | Fletcher et al. | |
| 2009/0235285 | A1 | 9/2009 | Kim et al. | |
| 2009/0265362 | A1 * | 10/2009 | Parsons et al. | 707/10 |
| 2009/0328137 | A1 | 12/2009 | Liang et al. | |

OTHER PUBLICATIONS

Tyler Close, "Web-key: Mashing with Permission," Hewlett-Packard Labs, (2008), presented on Apr. 21-25, 2008, Beijing, China, pp. 1-8.
"Design pattern in simple examples," Jul. 5, 2007, http://www.go4expert.com/forums/showthread.php?t=5127, pp. 1-53.
Office Action issued by the U.S. Patent Office on Dec. 22, 2011 in connection with related U.S. Appl. No. 12/763,798.
Office Action issued by the U.S. Patent Office on Jan. 9, 2012 in connection with related U.S. Appl. No. 12/763,517.

* cited by examiner

*Primary Examiner* — Omar Abdul-Ali
(74) *Attorney, Agent, or Firm* — Posz Law Group, PLC

(57) ABSTRACT

A computer system includes a display interface, a user input device interface, and a processor cooperatively operable with the display interface and the user input device interface. The processor is configured to facilitate displaying, via the display interface, a mashup or service; interacting with the user to input, via the user input device interface, an indication to take a snapshot of the mashup or service being currently displayed via the display interface; and storing a snapshot artifact of live data from the mashup or service at the instant the snapshot is taken.

17 Claims, 7 Drawing Sheets

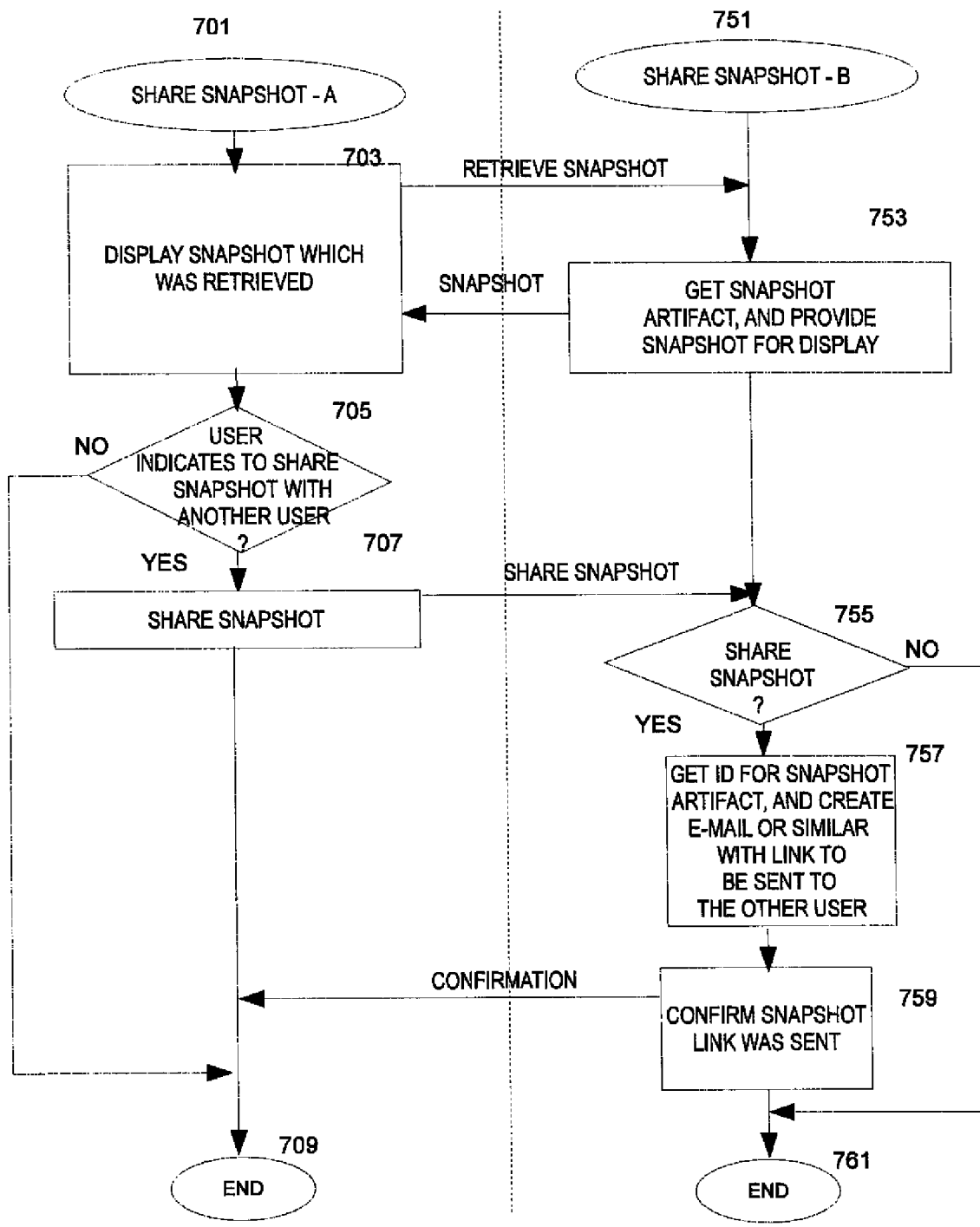

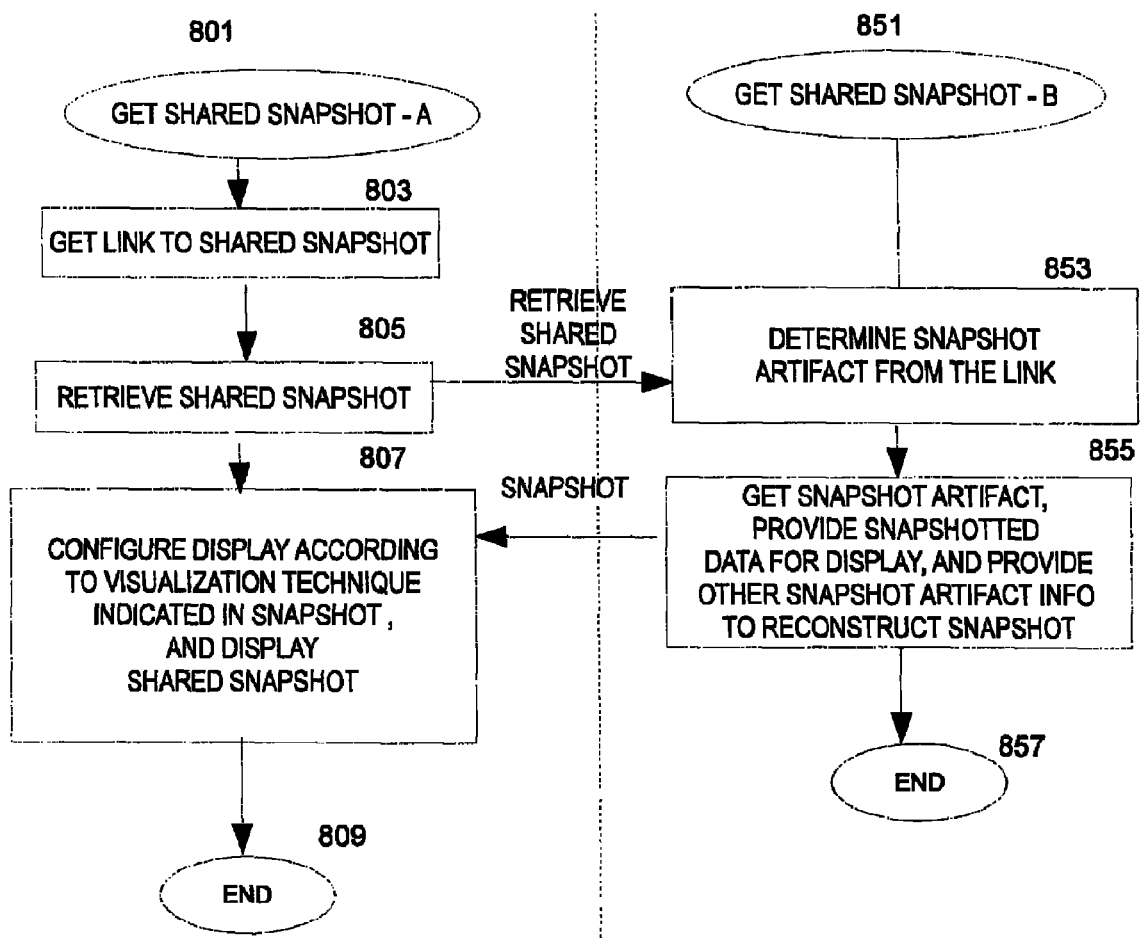

METHOD AND SYSTEM FOR CAPTURING MASHUP DATA FOR COLLECTIVE INTELLIGENCE AND USER-GENERATED KNOWLEDGE

CROSS-REFERENCE TO RELATED APPLICATIONS

This application claims the benefit of the following Provisional application: 61/171,379 filed Apr. 21, 2009, which is expressly incorporated herein by reference.

TECHNICAL FIELD

The technical field relates in general to computer networks, and more specifically to mashups and collecting data from mashups.

BACKGROUND

Mashups are known for obtaining live data from web services and providing the data to the user in a more flexible manner than conventional portals. Users of mashups interact with live data that continuously changes.

However, storing and/or sharing the live data from mashups presents challenges. For example, how do we know why certain decisions were made based on the usage of mashups?

SUMMARY

Accordingly, one or more embodiments provide a computer system for taking/sharing a snapshot, a method for taking/sharing a snapshot, or a computer-readable non-transitory medium for taking/sharing a snapshot. The computer system includes a display interface; a user input device interface; and a processor cooperatively operable with the display interface and the user input device interface. The processor can be configured to facilitate displaying, via the display interface, a mashup or service, interacting with the user to input, via the user input device interface, an indication to take a snapshot of the mashup or service being currently displayed via the display interface, and storing a snapshot artifact of live data from the mashup or service at the instant the snapshot is taken. The method or computer-readable non-transitory medium can also adapted to these.

Further embodiments include interrogating the user to provide a reason why the snapshot was taken.

According to still further embodiments, plural mashups are displayed via the display interface, and one interacts with the user to input, via the user input device interface, a selection of one of the currently displayed mashups for the snapshot.

According to further embodiments, the indication to take the snapshot is one touch of the user input device that triggers the storing of the snapshot.

According to yet another embodiment, the snapshot artifact includes a timestamp, service or mashup identifier used for the mashup, copy of input data supplied to the mashup or service, copy of output data obtained from the mashup or service, and configuration information instructing the processor how to visualize and use the data in the snapshot.

Still another embodiment includes interacting with the user to so as to share the snapshot with another user.

Another embodiment provides for scheduling a plurality of snapshots to be taken at pre-defined intervals.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles.

FIG. 3 is a user interface 301 for collecting snapshots.

FIG. 4 is a user interface 401 for sharing snapshots of FIG. 3.

FIG. 7 is a flow chart illustrating a procedure to share a snapshot with another user.

FIG. 8 is a flow chart illustrating a procedure to get a shared snapshot from another user.

DETAILED DESCRIPTION

Figure 1:
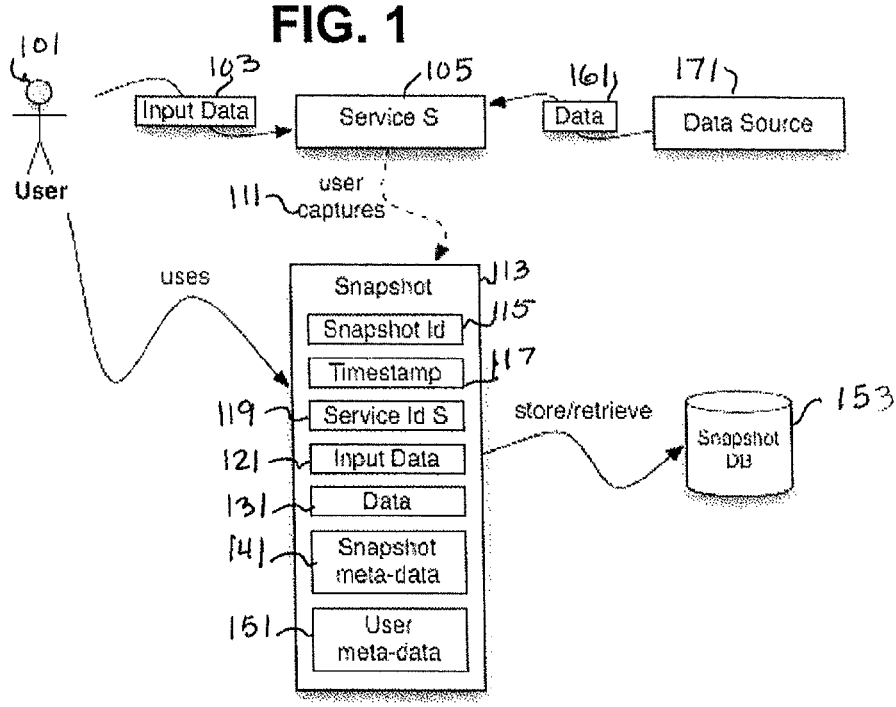
FIG. 1 is a block diagram illustrating a system for taking a snapshot of a single service.

In overview, the present disclosure concerns computer systems, sometimes referred to as client/server networks, such as may be associated with computer systems providing mashups. Such computer systems often involve running a mashup on a user's computer that provides a user interface on the user's computer and that communicates as a client with a mashup server that invokes the desired web service specified by the mashup, the web service providing live data through the mashup client/server, so that the live data can be used according to the mashup without regard to user interface formatting specified by the web service. More particularly, various inventive concepts and principles are embodied in systems, devices, and methods therein for collecting live data from mashups, and retrieving and/or sharing the collected data.

The computer systems of particular interest are those providing or facilitating mashups over communication networks involving a mashup server and a user's computer, and the like, and variants or evolutions thereof.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

As further discussed herein below, various inventive principles and combinations thereof are advantageously employed to improve the ability to relate live mashup data to decisions based on the mashup data.

A mashup user might desire to have a mechanism of storing current live data from the mashup with the user's own annotations so that the data can be recalled and viewed at a later time.

For example, many decision makers might like to store the data and describe and relate the data to the decision they make. This may allow a way to provide an audit trail of why a decision was made and what other factors affected that decision.

In addition, that data can then be shared with their peers and managers immediately or at a later time.

Further in accordance with exemplary embodiments, there is provided a method, system, and/or device to capture, reuse, annotate, share, and analyze mashup data for collective intelligence and user-generated knowledge.

An embodiment can conveniently be used in connection with the PRESTO™ Enterprise Mashup Platform product available from JackBe Corporation.

It is envisioned that some systems and methods described herein may facilitate easier and powerful ways to analyze mashup data by means of trend analysis and also by means of capturing user knowledge related to the data instantaneously.

The term "snapshot" generally refers to a data set including a unique service identifier, "input data" (the inputs supplied by the invoking user or the invoking mashup to the service), and live data provided from the service that is captured at a single moment in time. The unique service identifier, input data, and live data alone can be used to later retreate the mashup at that single (previous) moment in time. A snapshot can be uniquely identified by the time it was captured and the inputs supplied by the invoking user or invoking mashup to the service or mashup. The output thus obtained can be stored along with the meta-data associated with the output data. The meta-data can be system generated or user entered inputs to enrich information about the snapshot based on user knowledge of the domain of the mashup or service and the data. For instance, a user who is browsing a service or a mashup and invokes it by providing certain input(s) and therefore obtaining certain output(s) can decide to store the data as a snapshot. In doing so, the user may provide additional information such as: a description, a set of tags (folksonomy), annotations and comments, and other similar information, which can be stored with the snapshot artifact.

The system can store a snapshot as a reusable and shareable snapshot artifact in a specially designed snapshot database. Once stored, the snapshot artifact, that is, a snapshot and the related meta-data can be retrieved at any time, such as by a user with appropriate credentials and permissions. The term "snapshot artifact" as used herein is specifically defined herein below.

A snapshot can have a unique url address and can be retrieved by the user at any point in time.

Some versions hereof provide for sharing snapshots. In some versions, a snapshot can be shared with other users on an individual basis, or with groups of users. It can also be shared publicly for non-users of the systems to see; this can be useful to publish information to public-facing online and mobile destinations.

The snapshot system can include, but some versions need not be limited to, the following components:

1. Snapshot design/definition
2. Design definition of meta-data to be associated with the snapshot in the snapshot artifact
3. Design and implementation of a database that can accommodate snapshots and their meta-data
4. Design and implementation of security and governance policies around creation and usage of snapshots
5. Design and implementation of tools for viewing and analyzing snapshots textually and graphically.
6. Design and implementation of a collaboration system for snapshots to allow for sharing, rating, tagging and annotating.
7. Design and implementation of an export mechanism to select and export snapshots into common data formats such as HTML, XML, Excel and CSV files, variations and evolutions thereof, and other file formats as they may be defined from time-to-time.
8. Design and implementation of data visualization software to visualize snapshots
9. Design and implementation of a snapshot management system for system administrators to configure and manage snapshots.

The term "snapshot artifact" as used herein expressly refers to a data record with individually accessible data fields that include: a timestamp indicating an instant in time that the snapshot is taken; a unique identifier uniquely indicating, to a mashup server, the service id or mashup id used by the mashup server with the input data to invoke the mashup or service that generated the output data at the time indicated by the timestamp; copy of the input data supplied from the mashup server to the service or mashup that generated the output data at the timestamp time; copy of the output data obtained from the service or mashup and provided (e.g., displayed) to the user (and that caused the user to request the snapshot) at the timestamp time; and snapshot meta-data (system generated) and user meta-data (user entered meta data). Snapshot meta-data can include a description, searchable tags, and additional visualization configuration information to instruct the mashup how to visualize the data in the snapshot. User meta-data can include a user-input description and searchable tags.

Features of a snapshot device, method and system can include but need not be limited to:

1. Capture and save a snapshot at any time upon request by the user.
2. Schedule automatic snapshot captures—one time or a periodic/repeating (e.g., every x hours, or y days, weekly on d day of the week) until mm/dd/yy.
3. Select and delete one or more snapshots depending on user permissions.
4. List available snapshots for a given service/mashup.

5. Share a snapshot with another user(s), group(s), all registered users, anonymous as a mashlet, as an URL (to HTML, CSV, XML, JSON, and the like, and variations and evolutions thereof).

6. Show shared snapshots: snapshots I have shared, and snapshots that others shared with me.

7. Given a user(s), get all the snapshots created by that user(s).

8. Given a user(s), get all snapshots shared by the user(s), grouped by sharing (user-user, user-group, user-everyone, user-anonymous).

9. Given a group, get all the snapshots shared with that group.

10. Policy/entitlements definitions for security can include but need not be limited to:
1. Snapshots feature as an entitlement that can be granted to a user or a group or to all registered users of the system.
2. Specify the snapshot limit: how many snapshots per service.
3. Specify sharing options: Can share, cannot share.
4. How long are the snapshots stored: permanently or specific duration.
5. At the time of service/mashup registration, ability to specify if the service is "snapshottable".
6. Can/cannot export a snapshot.

11. Ability to export snapshot into several output formats including, but not limited to HTML, XML, JSON, CSV, Excel, and the like, and variations and evolutions thereof.

12. Event generation based on snapshot data (e.g., watch for certain conditions and generate a notification).

13. Annotate the snapshot with user comments and information/knowledge about data, thereby to enrich the snapshot data for later use.

14. Annotate the snapshot with micro-formats (hCard, hCalendar, Twitter #hashtags, and the like, and variations and evolutions thereof).

15. Generate usage and trends based on annotations above.

For example, a selectable snapshot button or camera icon or the like can be provided as an indication to instruct the mashup to take a snapshot, so that a user can click on the snapshot button or camera to capture some of the current information (also referred to as components) in a mashup which is being displayed on the user's screen at the current time. A user can click on the camera (or other button) to indicate that a snapshot is to be taken, and can click on any of the currently displayed mashups on a screen to take a snapshot. Other appropriate means of indicating that a snapshot is to be taken can be used.

The user can be interrogated to describe the reason why the snapshot was taken. For example, if a user takes a snapshot of stock holdings, the snapshot can collect the current live data (from the components provided by the data provider service or an internal service), provide a description of the reason for the snapshot, such as "I am selling these stocks." The reason can be stored in the snapshot database together with other information input by the user, along with the data at the instant of the snapshot from the component output from the service(s) of the mashup.

In a mashup, for example, PRESTO brand software (available from JackBe Corporation), the mashup application allows a user to collect live data (components) from different sources, and optionally to combine them. Content within the mashup describes how the components that are collected are to be combined. What the snapshot does is capture the actual live data at that moment in time.

Each snapshot can be individually stored and can have a separate unique identifier. The unique identifier for a particular snapshot can be the timestamp and the set of inputs that the user provides to go to the mashup snapshot interface (e.g., today's date and "NASDAQ stock exchange" and "customer's account ID").

The snapshot thus can be captured and stored. It may later be retrieved.

Since the snapshot is data, the user can do many things with it. The snapshot itself is an artifact that can be controlled by a mashup.

Policies can be applied around uses and creation of snapshots.

Once a system of snapshots is available, the snapshots can be shared with other users.

One or more aspects are now described with respect to examples illustrated in the figures.

FIG. 1 illustrates that a user can take snapshots of data coming from live services.

Figure 2:
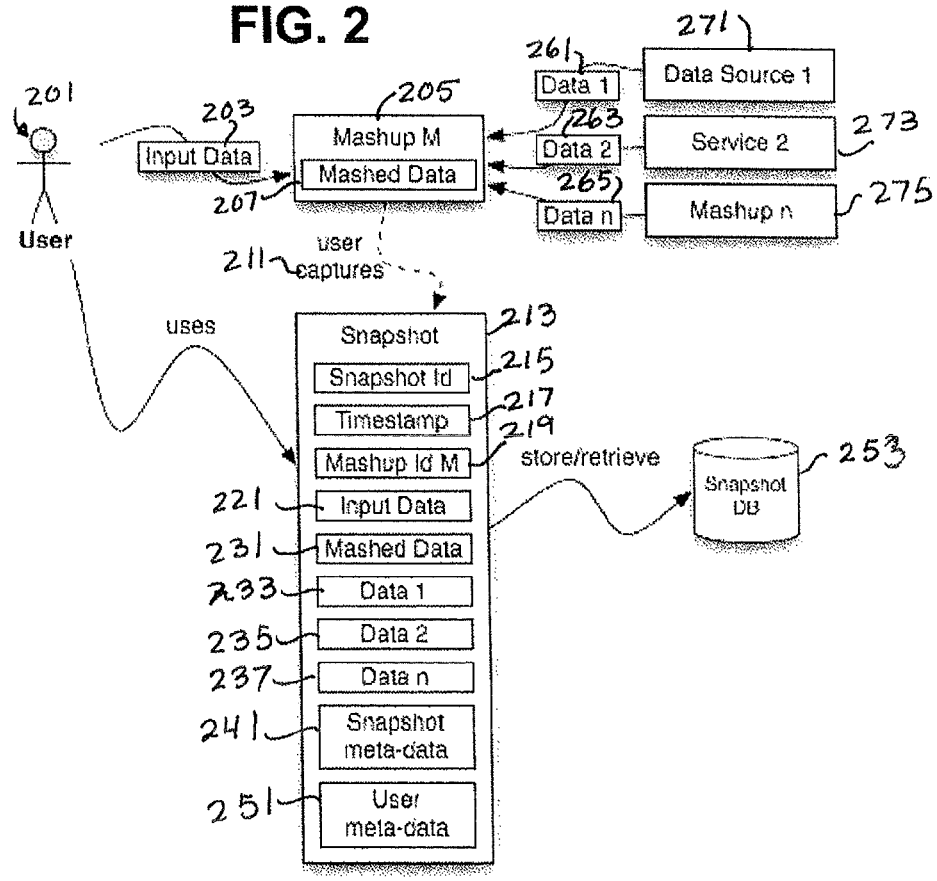
FIG. 2 is a block diagram illustrating a system for taking a snapshot of a mashup that uses multiple services and mashups.

FIG. 2 illustrates that a user can take snapshots of data from mashups, which are in turn interacting with live services. In either case, the description is identical, except that FIG. 1 concerns a service and uses a Service ID, and in FIG. 2 concerns a mashup and uses a mashup ID.

Referring now to FIG. 1, a block diagram illustrating a system for taking a snapshot of a single service will be discussed and described. In FIG. 1, there is a user 101, input data 103, service S 105, data source 171, data 161 (from the data source), and a snapshot artifact 113 generated when the user 101 captures 111 a snapshot of the service S 105. The snapshot artifact 113 includes a snapshot ID 115, a timestamp 117, a service ID S 119, input data 121, data 131, snapshot meta-data 141, and user meta-data 151. The snapshot artifact 113 can be stored in a snapshot database 151.

In FIG. 1, the snapshot ID 115 can be a unique identifier, to uniquely identify different snapshots, generated by the system at the time of capturing the snapshot. The timestamp 117 can be recorded for historical and reporting reasons. For example, when there is a collection of snapshots, a user may want to limit to a begin/end time.

The service ID 119 can identify a unique identifier of the service from which the snapshot was taken. The service ID 119 can be generated according to known techniques. For example, conventions provide that when the service 105 is published into a mashup platform, the mashup platform automatically generates the service ID which can be used anytime that service is recalled for the user. When a system has the unique ID, the system can perform service invocation and can retrieve other information about the service. Publishing a service ID 119 is a known technique, e.g., as provide in PRESTO brand mashup software.

The system can capture the information the user enters for the service as the input data 121, and the information provided most recently by the service 105 as the data 131. Input data can be omitted or not stored within the snapshot artifact 113, depending on what the service 105 requires to execute the data. Some services are predefined to not have any inputs. In other cases, the service is predefined to require inputs. For example, to get the stock report record from a stock report data service, the stock symbol and date is needed to retrieve the price. If there is input data, the snapshot artifact 113 stores the input data 121 that the user provided most recently to invoke the service 105 by the time of requesting the snapshot 111. So, when a snapshot is taken of the data 161 at that point, in this example the data 131 is the stock price, and the input data 121 is the date and the stock code.

Data 131 stored in the snapshot artifact 113 is the actual data 161 from the data source 171 via the service 105 that is captured. In the above example, data 131 is the stock price.

Whatever the service 105 returns after being invoked, that data 131 is stored in the snapshot. This data 131 that is stored in the snapshot artifact 113 is intended to be the data that the user wanted to memorialize and consequently this is the data that triggered the intention to take a snapshot.

The snapshot artifact 113 can store meta-data, which can conveniently be divided into two different meta-data: snapshot meta-data 141 and user meta-data 151. The metadata in the snapshot artifact 113 can be things like category, tag, comment or description provided by user, and similar variations. The meta-data can be user input, or can be derived from existing data.

Snapshot meta-data 141 are intended to be things that the system generates and stores along with the snapshot information, such that the snapshot meta-data 141 is related to the snapshots in a manner that the 101 can later retrieve the snapshot in a user-friendly manner (e.g., by searching, by listing, and the like).

User meta-data 151 are intended to be information about the user that performed the operation, or user comments about specific data within the snapshot element, and the like. If the system stores a snapshot artifact 113, the system can store who took the snapshot, e.g., user ID, etc. The user meta-data 151 can be user input. Consider, for example, that the user 101 uses the service 105 to get all stock prices by Apple for the week, and the user 101 wants to add a comment to the Wednesday data. In one embodiment, the user meta-data 151 can be annotations on top of the snapshot, especially with regard to elements within the data. The user meta-data 151 might indicate, "select 5$^{th}$ row and add my annotation" plus the user text annotation.

There are some subtle differences between user meta-data and snapshot meta-data that relate to the intended use of the meta-data. The system can interrogate the user 101 when the user takes a snapshot; this can be stored as snapshot meta-data 141. As another example, if a user 101 wants to say something about the mashed data, the user can enter a text comment and that can be stored in the snapshot artifact 113 as user meta-data 151.

All of the snapshot artifact 113 data gets stored into the snapshot database 151. For example, each snapshot artifact 113 can be stored as a separate record in the snapshot database 151. Any conventional database can be used as the snapshot database 151, for example, a conventional hierarchical database.

In FIG. 1, the service application is invoked through the mashup server (discussed further below) in accordance with known techniques. The service 105 into which the user 101 is inputting data was previously published according to conventional techniques inside a mashup platform, for example, within the mashup server. Consider for example that there is a web service 105, which was previously published in the mashup platform. Once it is published, the service 105 is exposed to the user either through a user interface (UI) or an application program interface (API), in accordance with known techniques. When the user 101 sees the service 105 on the UI or API, it was invoked through the mashup server. The request to capture a snapshot of the data currently displayed (e.g., click on a snapshot button or icon) along with the input data, is sent from the user's computer to the mashup server; the mashup server can look up the service ID from the invocation of the service from the mashup repository (as is conventionally known). When the user 101 sees the data from the service 105 displayed on the display, the user has already invoked that service.

The fact that the service 105 is invoked means that the mashup server already has the currently displayed data and is temporarily buffering (e.g., caching in local memory) the input data 103 from the user 101 and the live data 161 from the service 105.

The snapshot button clicking triggers the mashup server to save the most recent data from the service 105 and the most recent service invocation data (input data 103 from the user 101); also, this triggers the mashup server to discard the most recent data 161 from the service and to begin to temporarily buffer the new data from the service 105. Basically when the user 101 takes a snapshot, the user is taking a snapshot of the last invocation input data 103 and data from the service 105. When the user invokes the service 105, the mashup platform can temporarily retain the data returned by the service until the snapshot is triggered. The request for the snapshot sent to the mashup server can cause the mashup server to save the input data 121 and data 131 as part of the snapshot artifact 113, e.g., as a record stored into the snapshot database 151. Until the snapshot is requested by the user 101, nothing need be stored into the snapshot database 151, because apparently none of the data is yet of interest. The user 101 request for the snapshot is when the snapshot artifact 113 is created and stored, with snapshot ID 115, timestamp 117, service ID 119, input data 121, data 131, snapshot meta-data 141 description, and user meta-data 151 annotations.

Referring now to FIG. 2, a block diagram illustrating a system for taking a snapshot of a mashup that uses multiple services and mashups will be discussed and described. FIG. 2, taking a snapshot of a mashup, can be described identically to FIG. 1, except for reference to the mashup instead of the service. Hence, much of the description will be omitted, and similar reference numerals are used, e.g., In FIG. 1 and FIG. 2, respectively, there is a user 101, 201, input data 103, 203 and a snapshot artifact 113, 213 generated when the user 101, 201 captures 111, 211 a snapshot of the service S 105 or mashup M 205. The snapshot artifact 113, 213 includes a snapshot ID 115, 215; a timestamp 117, 217; a service ID S 119 or mashup ID M 219; input data 121, 221; data 131 or mashed data 231, data 233, data 235, and data n 237; snapshot meta-data 141, 241; and user meta-data 151, 251. The snapshot artifact 113, 213 can be stored in a snapshot database 151, 251. In FIG. 2 compared to FIG. 1, there is a mashup M 205 instead of service S 105; instead of data source 171 providing data 161, there can be a data source 271 providing data a 261, service 273 providing data s 263, and mashup n 275 providing data n 265. Moreover, from the user perspective, the user might not even be aware whether it is a service or a mashup that is providing the data which the user captures 111, 211. The implementation can be the same for snapshots and mashups. The snapshot database 151, 251 can be the same for services and mashups.

As stated above, for the mashup snapshot artifact 213 it is a mashup ID 219 that is stored instead of a service ID. The mashup snapshot artifact 213 goes into the same database as the service snapshot artifact. The mashup snapshot artifact 213 has mashed data, data 1, data 2, and data n 231, 233, 235, 237. Recall that the mashup can combine data from different data sources and/or mashups, according to known techniques, to form mashed data. As is conventional, the mashup produces a mashup result, which is conventionally provided to the user of the mashup: mashed data, data 1, data 2, and data n. The mashed data 231 is stored in the snapshot artifact 213 as well as the original source data (data 1, data 2, data n) 233, 235, 237 to see what was used in building the mashed data 231. Also, the snapshot artifact 213 can store an indication of the visualization techniques used by the data 131, 231, 233, 235, 237 to be visualized, so that the snapshot meta-data can be retrieved and presented in the same visualization technique as used to originally presented the data.

Figure 3:
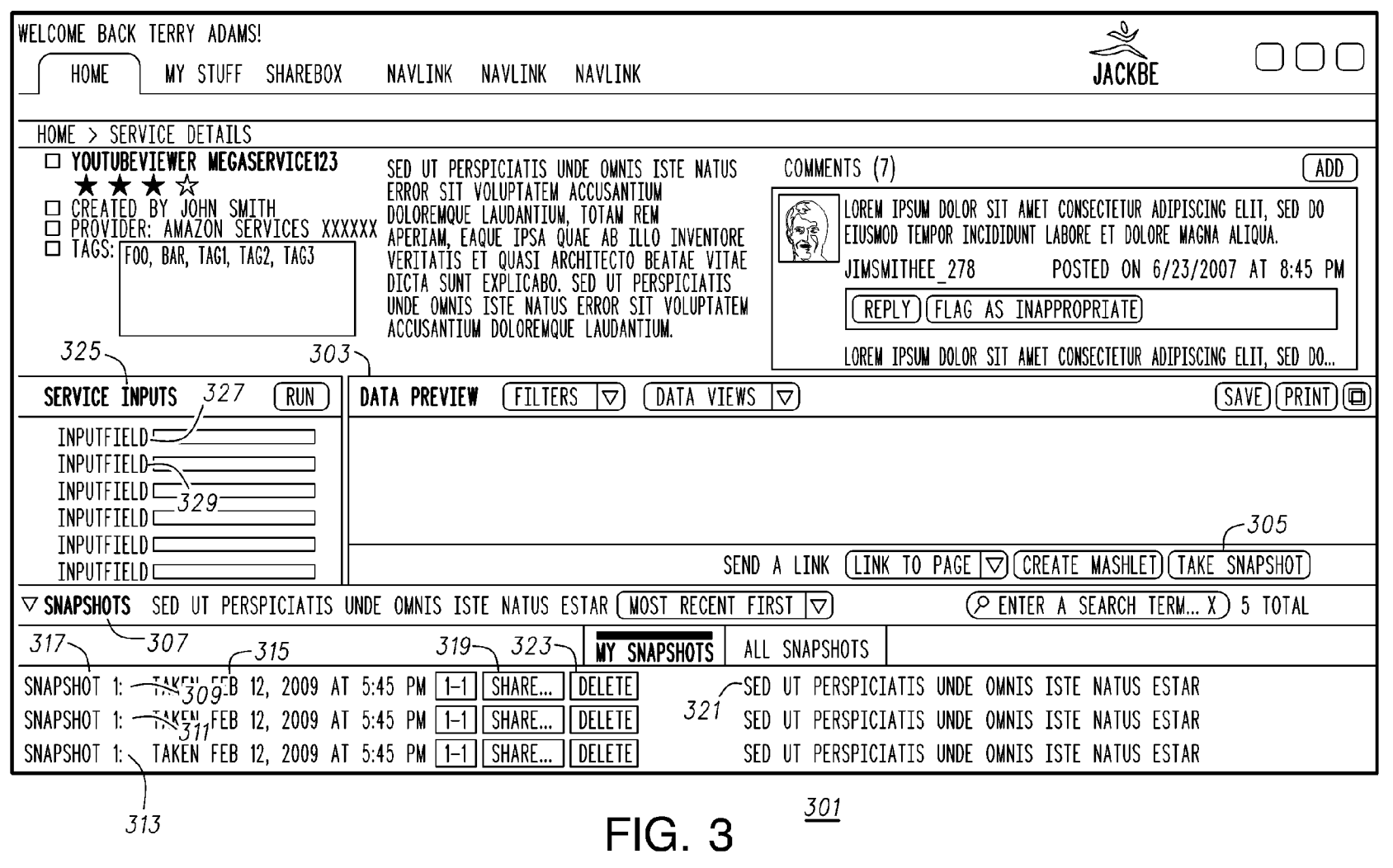
Figure 4:
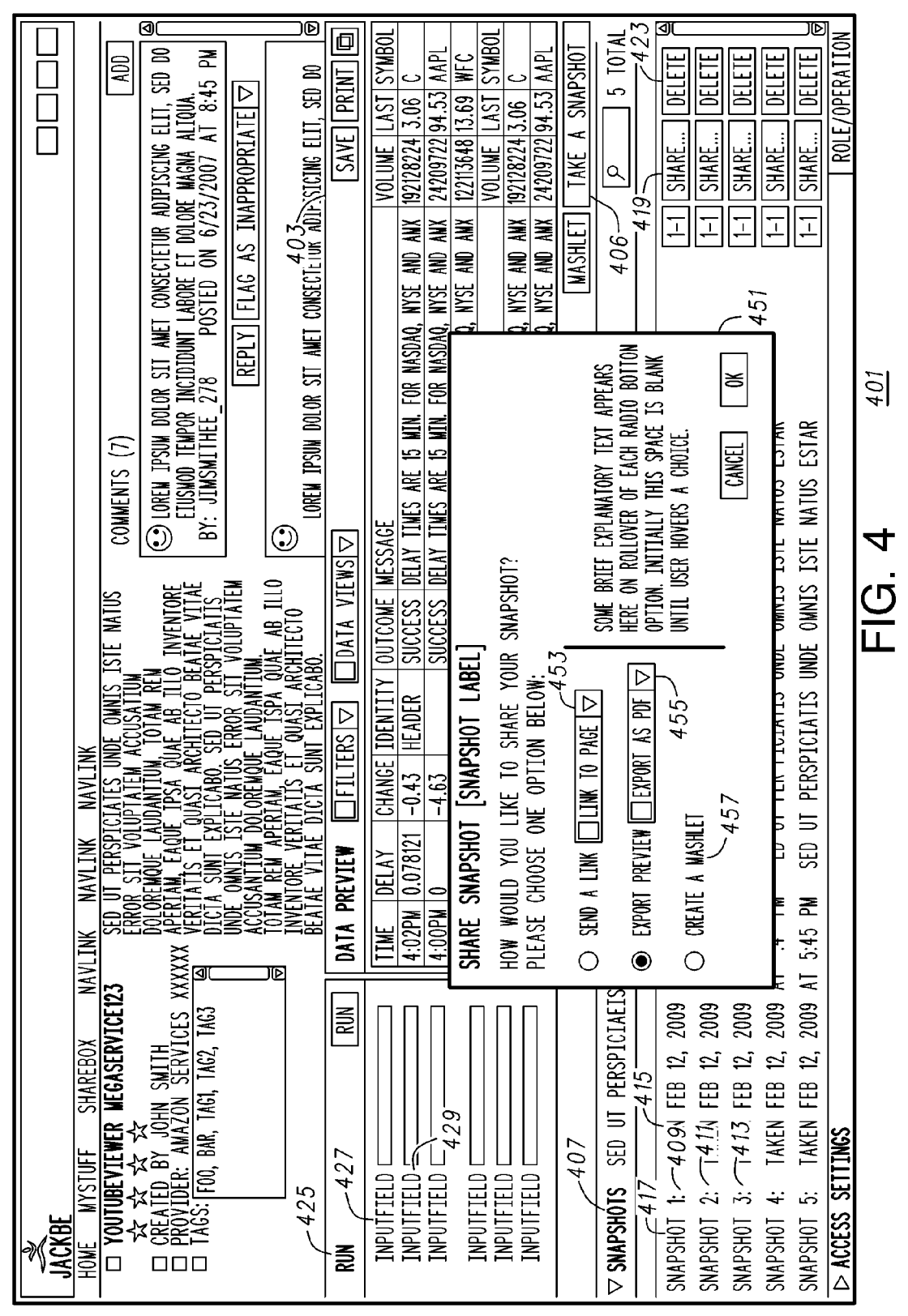

FIG. 3 and FIG. 4 are illustrations of exemplary user interfaces, with FIG. 3 being a user interface for snapshots and FIG. 4 illustrating sharing snapshots.

Referring now to FIG. 3, a user interface 301 for collecting snapshots will be discussed and described. FIG. 3 (Deepak might send an updated screenshot of actual implementation, which looks mostly the same.) In FIG. 3, the "Data Preview" box 303 provides a visualization of the data when the service (here, "YouTube Viewer MegaService 123") is invoked (as a service or from a mashup) according to known techniques, e.g., Data 1, Data 2, mashup data. A "Service Inputs" menu 325 can be provided so that the system can interact with the user to obtain input data, e.g., the illustrated "Input Field" 327, 329. The input data is specific to the service or mashup, and in some instances can be omitted. FIG. 3 also provides a "Take Snapshot" button 305, which is a user-selectable indication to take a snapshot of the mashup or service currently being displayed on the display, e.g., within the data preview box 303. The user can run the service (or mashup) and then the system can interact with the user to select the "Take Snapshot" button 305. Then, at the bottom of the illustrated display, there can be provided a "My Snapshots" menu 307. That is where the snapshots which have been taken can be displayed, e.g., in a list as illustrated. For example, the item in the list "Snapshot 1" 309 lists the snapshot meta-data tag or description of the snapshot 317, the date it was taken 315, the user metadata 321, and actions to take on the snapshot (share 319, delete 323). In FIG. 3, the "Data Preview" box 303 corresponds to the "Data" boxes of FIG. 1 and FIG. 2, and the "My Snapshots" area basically corresponds to the snapshots meta-data.

The illustrated screen can be used for taking snapshots and reviewing snapshots. A snapshot can be taken by running a service or mashup in the data preview area 303 and then selecting the "Take Snapshot" button 305. A snapshot can be reviewed by selecting a row in the "My Snapshots" menu 307, which can retrieve the snapshot artifact (as described above) and displaying the data therein according to the visualization technique therein in the "Data Preview" area 303. "Data Preview" can switch from live data to retrieved snapshot data.

Referring now to FIG. 4, a user interface 401 for sharing snapshots of FIG. 3 will be discussed and described. Similar reference numerals are used in FIG. 3 and FIG. 4 for the same elements, e.g., "Data Preview" area 303, 403. In FIG. 4, the user has clicked on the "share" button 319 in the "My Snapshots" menu 407, so that the system interacts with the user to share the snapshot with a different user. In the illustrated example, a pop-up screen 451 opens up. The system interacts with the user to specify a technique which the user wishes to use to share the snapshot, and to obtain an identity of the destination user to receive the snapshot. In the illustrated example, the pop-up screen 451 queries the user to "Send a link" 453 to a destination user within the mashup system (described further below), or to export the data 455 as a known file, e.g., .pdf or Excel (according to known techniques), or to create a mashlet 457 for a destination user to use (according to known techniques).

When a user selects to share a snapshot by sending a link 453, the system can create a link uniquely indicating the snapshot artifact, and the system can interact with the user to select to the destination user to send the link to by, e.g., displaying a form (similar to an e-mail), with optional comments; and can prompt the user to click on send. The system can send a notification and e-mail to the destination user with a link. When the destination user clicks on the link, the system can retrieve the snapshot artifact indicated by the link so the destination user can see the exact same data that was in the snapshot at the moment it was captured, visualized in the same way. When the destination user clicks on the link (the link indicating the particular snapshot artifact on the mashup server) the user can be authenticated according to conventional techniques (if appropriate), and then the user can be taken to a page (such as illustrated in FIG. 3) where the snapshot artifact can be retrieved and displayed to the destination user.

All of the information that the mashup server needs to retrieve the snapshot artifact can be incorporated within the link so that the mashup server can retrieve the input data and data from the snapshot artifact and display the data in the same manner, using the same visualization technique, as the user who took the snapshot. The mashup server does not need to re-invoke the service indicated in the snapshot artifact in order to obtain or visualize the data.

Consider a concrete example, in which a first user takes a snapshot of a pie graph and shares the snapshot by sending a link. The destination user receives the link to the pie graph snapshot and gets the same visual provided to the first user by clicking on the link. When the link is clicked on, the mashup server retrieves the data, input data, meta data, and visualization/configuration data, and displays the same visual, all as stored in the snapshot artifact uniquely indicated by the link.

As another concrete example, consider a service that is a map service of a road map from A to B. Input data is points A and B; data is conventional road links from A to B; and snapshot meta-data is "Map from point A to B" and the preferred visualization technique (map view or road list). The visualization is a satellite view of the map, or a list as text view, i.e., the visualization can be different. So, the snapshot meta-data indicates "map visualization" instead of "road list". A link is sent to the destination user. When the destination user clicks on the link, the mashup platform retrieves the snapshot artifact indicated by the link, and all of the information in the snapshot artifact as discussed above. In this example, the visualization displays the road links as a map (using the retrieved data which is the conventional road links) instead of a list of roads.

In operation, to make a snapshot, the user invokes a mashup or service on her display. The user clicks on the camera icon or snapshot button to take a snapshot of the currently displayed data, at the instant the camera icon or snapshot button is clicked. The user's computer is programmed to request the mashup server to store the snapshot on the snapshot database. If the user's computer has the input data and current data, then the request to store the snapshot can include the data and input data; otherwise, if the mashup server has the timestamp, mashup ro server ID, input data, and data (e.g., data from the mashup or service), then it is not necessary for the request to store the snapshot to include the data and input data. The system then can interrogate the user to obtain metadata indicating a reason why the snapshot was taken, to store in the snapshot artifact.

Also, the system can provide for sharing the snapshots, as described in more detail elsewhere in this document.

In another aspect, the system can provide for periodically taking the snapshots on a particular schedule. The schedule can be typical calendar scheduling, e.g., interval, duration, etc. The system can interact with the user to take the current snapshot as well as to pre-define the periodic interval for taking additional snapshots. The system can execute the snapshot on behalf of the user even if the user is not logged in, for example by periodically executing the service (or mashup) to obtain the data which can be stored in successive snapshots, one for each periodic interval.

In another aspect, the user can interact with the system to select one of plural currently displayed mashups for the snapshot. For example, the user can be searching for stocks, or highest rated mashups, or who created the mashups themselves, or top rated mashups, or mashup favorites (there are many ways for a user to get to a mashup). This is similar to a You-Tube model technique. Also, a mashup can be favorited by a user, that is added to a user's "my favorites", and the like.

Figure 5:
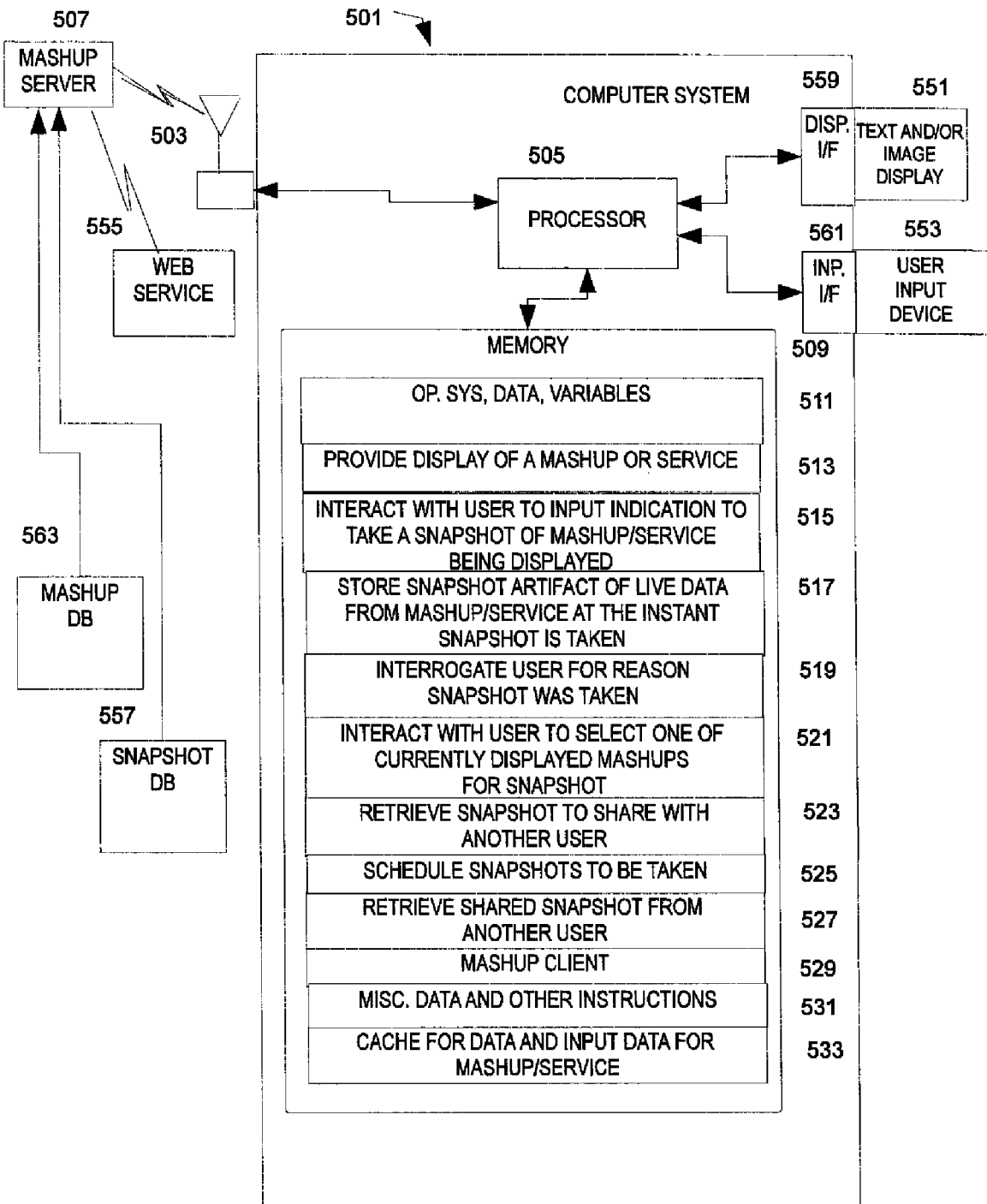
FIG. 5 is a block diagram illustrating portions of an exemplary computer system for snapshots.

Referring now to FIG. 5, a block diagram illustrating portions of an exemplary computer system for snapshots will be discussed and described. The computer system 501 may include a communication port and/or transceiver 503 or the like for communication with a mashup server 507, a processor 505, a memory 509, a display interface 559, a display 551, an input interface 561, and/or a user input device 553 such as a keyboard.

The mashup server 507 can be a part of a mashup platform comprising the mashup server 507 and a mashup client 529 which can execute on the processor 505 of the computer system 501. Mashup server and mashup client functions can be distributed between the mashup server 507 and the mashup client 529 according to known techniques. The mashup server 507 can invoke services 555 as is known to obtain data from data sources, such as web services and the like. Also, the mashup server 507 can access a snapshot database 557 on which snapshot artifacts are stored, as is further described herein.

The processor 505 may comprise one or more microprocessors and/or one or more digital signal processors. The memory 509 may be coupled to the processor 505 and may comprise a read-only memory (ROM), a random-access memory (RAM), a programmable ROM (PROM), and/or an electrically erasable read-only memory (EEPROM). The memory 509 may include multiple memory locations for storing, among other things, an operating system, data and variables 511 for programs executed by the processor 505; computer programs for causing the processor to operate in connection with various functions such as providing 513 a display of a mashup and/or a service, interacting 515 with a user to input an indication to take a snapshot of a mashup and/or service being displayed, storing 517 a snapshot artifact, interrogate 519 the user for the reason the snapshot was taken, interact 521 with the user to select one of the currently displayed mashups or services for a snapshot, retrieve 523 a snapshot to share with another user, schedule 525 snapshots to be taken, retrieve 527 a shared snapshot from another user, a mashup client function 529, and/or other processing; and a database 531 for other information used by the processor 505. The computer programs may be stored, for example, in ROM or PROM and may direct the processor 505 in controlling the operation of the computer system 501.

The user may invoke functions accessible through the user input device 553, interface with the processor 505 through an input interface 561. The user input device 553 may comprise one or more of various known input devices, such as a keyboard and/or a pointing device, such as a mouse; the keyboard may be supplemented or replaced with a scanner, card reader, or other data input device; the pointing device may be a mouse, touch pad control device, track ball device, or any other type of pointing device; and the input interface 561 can be a known interface thereof to communicate with the processor 505.

The text and/or image display 551 is representative of a display that may present information to the user by way of a conventional liquid crystal display (LCD) or other visual display, and/or by way of a conventional audible device for playing out audible messages.

Responsive to signaling from the user input device 553, in accordance with instructions stored in memory 509, or automatically upon receipt of certain information via the communication port and/or transceiver 503, the processor 505 may direct the execution of the stored programs.

The processor 505 can be programmed for providing 513 a display of a mashup and/or a service, such as is performed according to known techniques when a user invokes a service or a mashup. As is known, the invocation of the mashup or service is performed via the mashup platform which comprises the mashup client 529 and the mashup service 507, sometimes requiring the system to interact with the user to input data and select a service or mashup via the user input device 553 and/or display 551, resulting in the mashup or service displaying data generated by the service 555 which is provided for the display 551.

The processor 505 can be programmed for interacting 515 with a user to input an indication to take a snapshot of a mashup and/or service being displayed. The mashup platform, i.e., the mashup client 529 and/or the mashup server 507, can be programmed to retain the most recent input data (provided when the mashup or service was invoked) and the data which is provided for the display in a temporary cache 553, here illustrated as being provided together with the mashup client 529 in the computer system 501 operated by a user.

The processor 505 can be programmed to cause the storing 517 a snapshot artifact of live data in the mashup or service at the instant the snapshot is captured, triggered by the snapshot being requested and automatically without further manual intervention collecting the data to be stored. For example, the user can select a button, icon, or other click-able or selectable input device to instruct the computer system 501 to take the snapshot of the current data on the display.

The processor 505 can be programmed to interrogate 519 the user via the display 551 and user input device 553 for the reason the snapshot was taken. That is, presumably the snapshot is requested to memorialize the significance of the data. In accordance with known techniques, the user can be interrogated to input a reason or title to associate with the snapshot, which can be stored as a snapshot meta-data in the snapshot artifact. Optionally, the user may be interrogated or prompted to provide additional snapshot meta-data and/or user meta-data.

The processor 505 can be programmed to interact 521 with the user via the display 551 and user input device 553 to select one of the currently displayed mashups or services to be used for a snapshot, when more than one mashup or service is provided on a display. For example, the available mashups and/or services can be provided on a user-selectable list.

The processor 505 can be programmed to retrieve 523 a snapshot and/or to share with another user. For example, the display 551 can list snapshot artifacts that were previously taken and stored in the snapshot database 557. The computer system 501 can interact with the user to select one or more of the snapshot artifacts that can be retrieved and then provided on the display, for example as previously described herein. The user can interact with the computer system 501 via the display 551 and user input device 553 to select a button, icon, or menu entry to cause the computer system 501 to share the selected snapshot artifact(s). As further described herein, the computer system 501 can interact with the user interact with the user via the display 551 and user input device 553 to select a destination user for the snapshot to be shared. Then, the computer system 501 can send a request to share the selected snapshot artifact to the mashup server 507. The mashup server 507 can construct a link that identifies the snapshot artifact to be shared, and can send the link to the destination user.

The processor 505 can be programmed to schedule 525 snapshots to be taken on a periodic basis or at pre-defined times. As described herein in more detail, the computer system 501 can interact with the user via the display 551 and user input device 553 to determine the periodic basis and/or pre-defined times when a snapshot is to be taken.

The processor 505 can be programmed to retrieve 527 a shared snapshot from another user. When a user receives a link with a shared snapshot from a first user, the user can interact with the computer system 501 via the display 551 and user input device 553 to select the link. Selecting the link with the shared snapshot causes the computer system 501 to request the snapshot artifact from the mashup server 507. Then, the computer system 501 can display the retrieved snapshot artifact on the display 551 as further described herein.

The processor 505 can be programmed for a mashup client function 529, in accordance with known techniques. That is, the mashup platform can be distributed between the mashup server 507 and the mashup client 529, as is known. Details which are not presently relevant are omitted from the present description.

The computer system 501 can include a central processing unit (CPU) with disk drives (not illustrated), symbolic of a number of disk drives that might be accommodated by the computer. Typically, these might be one or more of the following: a floppy disk drive, a hard disk drive, and a CD ROM or digital video disk. The number and type of drives may vary, typically with different computer configurations. Disk drives may be options, and for space considerations, may be omitted from the computer system used in conjunction with the processes described herein. The computer may also include a CD ROM reader and CD recorder, which are interconnected by a bus along with other peripheral devices supported by the bus structure and protocol (not illustrated). The bus can serves as the main information highway interconnecting other components of the computer, and can be connected via an interface to the computer. A disk controller (not illustrated) can interface disk drives to the system bus. These may be internal or external.

It should be understood that FIG. 5 is described in connection with logical groupings of functions or resources. One or more of these logical groupings may be omitted from one or more embodiments, for example, the functionality of scheduling periodic snapshots 525 can be omitted. Likewise, functions may be grouped differently, combined, or augmented without parting from the scope. Similarly the present description may describe various databases or collections of data and information. One or more groupings of the data or information may be omitted, distributed, combined, or augmented, or provided locally and/or remotely without departing from the scope of the invention.

Figure 6:
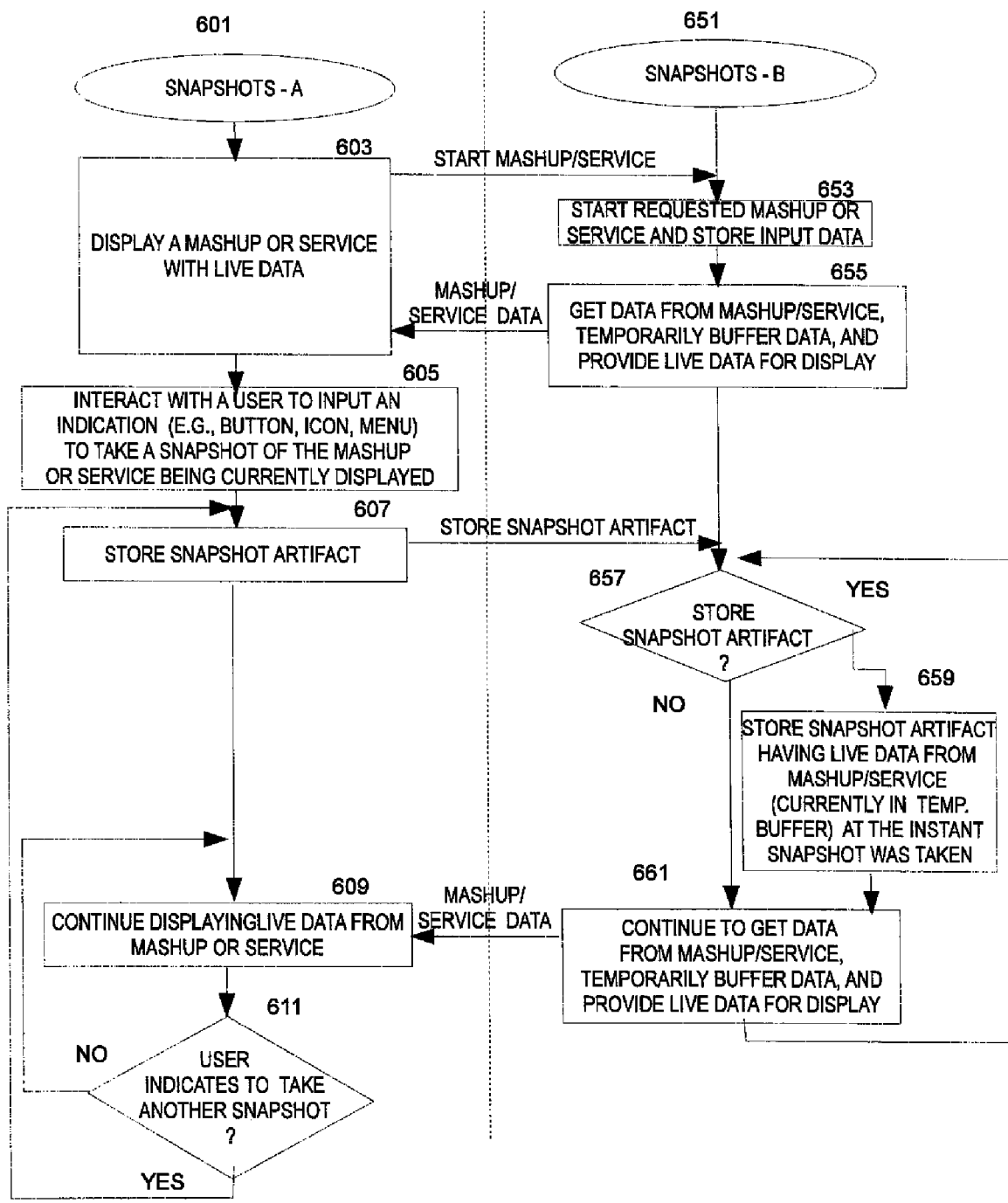
FIG. 6 is a flow chart illustrating a procedure to take a snapshot.

FIG. 6, FIG. 7 and FIG. 8 illustrate procedures to take a snapshot of a mashup or service, to share a snapshot with another user, and to get a snapshot that was shared by another user, respectively. Although illustrated as separate figures, it will be appreciated that a combination of two or more of these illustrated procedures can be implemented together on the same device(s). The procedure can advantageously be implemented on, for example, a processor of a computer system, optionally together with a mashup server, such as described in connection with FIG. 5 or other apparatus appropriately arranged. FIG. 6, FIG. 7, and FIG. 8 illustrate an "A" flow and a "B" flow, which may suggest that the procedure can be distributed as a client procedure and a server procedure.

Referring now to FIG. 6, a flow chart illustrating a procedure to take a snapshot will be discussed and described. In overview, FIG. 6 illustrates a procedure for Snapshots-A 601 and a procedure for Snapshots-B 651, which can interact. The snapshots-A procedure 601 can include to display 603 a mashup or service with live data, to interact 605 with a user to take a snapshot of the current mashup or service, to store 607 a snapshot artifact, to continue 609 to display live data from the mashup or service, and to repeat if the user indicates 611 to take another snapshot. The snapshots-B procedure 651 meanwhile includes to start 653 the requested mashup or service and to store the input data; to get 655 the mashup or service data, temporarily buffer it, and provide it for display; to check whether to store 657 a snapshot artifact; if so, to store 659 the snapshot artifact using the temporarily buffer data, etc.; and to continue 661 to get the data from the mashup/service, to temporarily buffer the data, and to provide live data from the mashup/service. This is described in some detail below; however, since much of this has been described above in detail, the discussion below may be abbreviated to avoid repetition.

The snapshots procedure 601 displays 603 a mashup or service with live data. This has been described in detail above. Illustrated in FIG. 6 is that a request to start the mashup/service can be sent to another procedure 651 to initiate the mashup or service as a server or in the background or the like. The other snapshots procedure 651 can start 653 the requested mashup or service and store the input data. The other snapshots procedure 651 then can get 655 the mashup or service data (according to known techniques), and provide the mashup or service data for display (according to known techniques). Also, the other snapshots procedure 651 can temporarily buffer the input data from the user (used to invoke the mashup or service) as well as the data most recently provided from the mashup (e.g., mashed data, mashup data, and/or service data) or service (e.g., service data), and in this way can always ready with a cache copy of the data from the mashup or service that is being presently displayed.

The snapshots procedure 601 can interact 605 with a user to take a snapshot of the current mashup or service being currently displayed, for example using a button, an icon, a menu, or the like, also described in great detail above. The snapshots procedure 601 is triggered to store 607 a snapshot artifact of the mashup or service currently on the display, by the user selecting the button, clicking the icon, or inputting an item from the menu, or the like. The user can be prompted to input a reason for taking the snapshot. Meanwhile, the snapshots procedure 651 can check whether to store 657 a snapshot artifact. If the user has triggered storing a snapshot artifact, the other snapshots procedure 651 can store 659 the snapshot artifact using the temporarily buffered data, the cached input data, a snapshot ID, a current timestamp, a mashup or service ID (respectively), snapshot meta-data (including optional reason for taking the snapshot), and user meta-data.

Thereafter, the snapshots procedure 601 can continue 609 to display live data from the mashup or service, as is conventional. Also, as is conventional, if the live data is updated, the updated live data can be displayed to the user. Meanwhile, the snapshots procedure 651 can continue 661 to get the data from the mashup/service, to temporarily buffer the data, and to provide the live data from the mashup/service. The snapshots procedure 601 can repeat if the user indicates 611 to take another snapshot. Accordingly, the snapshots procedures 601, 651 can provide for taking a snapshot of the mashup or service being currently displayed, and can store the snapshot artifact.

Referring now to FIG. 7, a flow chart illustrating a procedure to share a snapshot with another user will be discussed and described. In overview, FIG. 7 illustrates a procedure to share snapshot-A 701 and a procedure to share snapshot-B 751, which can interact. The procedure to share snapshots A 701 can include displaying 703 the snapshot, and if the user indicates 705 to share the snapshot, sharing 707 the snapshot. The procedure to share snapshots B 751 can include getting 753 the snapshot artifact and providing the snapshot for display, and if 755 the snapshot is to be shared, then getting 757 the ID for the snapshot artifact and creating an e-mail with the link to send to another user, and confirming 759 that the snapshot link was sent. These are discussed in some detail below, to the extent not previously discussed above.

The procedure to share snapshot-A procedure 701 can include displaying 703 the snapshot, for example by interacting with the user to select the snapshot to retrieve. This was discussed above in detail. The procedure to share snapshots B 751 can include getting 753 the snapshot artifact for the requested snapshot, and providing the snapshot for display.

Snapshots can be shared upon command by a user. Fore example, the procedure to share snapshot A 703 can include, if the user indicates 705 to share the snapshot, sharing 707 the snapshot. Then the procedure to share snapshots B 751 can include, if 755 the snapshot is to be shared, getting 757 the ID for the snapshot artifact and creating an e-mail with the link to send to another user. When done, the procedure to share snapshots B 751 can confirm 759 that the snapshot link was sent, and then both procedures can end 709, 761.

As indicated in FIG. 7, it is not necessary for the user to share snapshots.

Referring now to FIG. 8, a flow chart illustrating a procedure to get a shared snapshot from another user will be discussed and described. In overview, FIG. 8 illustrates a procedure to get a shared snapshot-A 801 and a procedure to get a shared snapshot-B 851, which can interact.

The procedure to get a shared snapshot A 801 can include getting 803 a link to the shared snapshot. The link may be obtained, for example, from an e-mail sent by the user that originated the snapshot to the destination user that will retrieve the shared snapshot. The shared snapshot is retrieved 805, and the snapshot artifact is determined 853 from the link. Then, the procedure 851 can get 855 the snapshot artifact from storage, provide the snapshot for display, and provide information from the snapshot artifact in order to reconstruct the display of the snapshot. Then, the procedure to get the snared snapshot A can configured 807 the display according to the visualization technique indicated in the snapshot artifact, and can display the shared snapshot. Consequently, the destination user can display the snapshotted data with the same visualization technique with which the snapshotted data was displayed to the originating user. Also, the destination user can view any annotation input as user data by the originating user. The procedure can end 809, 857.

The above description frequently deals with one user. However, consider for example a collection of users such as a group of financial analysts. In the collection of users, different users can retrieve and display different data in different points of time, taken as snapshots by different people, for the same service. The snapshots can be aggregated over time. For example, consider three stock analysts looking at the same stocks on different days. A mashup can include a financial reporting service and displays a full range of stocks. However, the three stock analysts take snapshots of the same selected stocks on different days. The snapshots from different users of the same components of the service can be shared and even tracked.

The term "mashup" is used to refer to a software application that combines pre-existing components from one or more information-providing services into a single tool which can comprise a server-side and a client-side application, where the components used by the mash-up are visually presented to a user on a display at the client-side in a manner which is different from the pre-determined presentation of the information-providing service. A mashup is frequently made by access to open APIs and other data sources to produce results that were not the original reason for producing the raw source data. An example of a mashup is the use of cartographic data from Google Maps to add location information to real estate data, thereby creating a new and distinct Web service that was not originally provided by either source. A "mashup", as the term is used herein, is expressly defined as being configured in accordance with mashup standards such as XML interchanged as REST (REpresentational State Transfer) or Web Services, RSS, Atom, and other evolutions and variations of mashup standards, or extracting data from a screen display output of a program on another site; but excluding simply linking to another site, such as through an HTML href. A mashup is to be distinguished from a portal in which content is presented side-by-side in the manner that is the same as the pre-determined presentation of the information-providing service.

The term "service" is used herein expressly to refer to an information-providing service that provides data from a server in a visual presentation on a display to a user, typically an application programming interface (API) or web API that can be accessed over a computer packet network and executed on a remote system hosting the requested services, in accordance with Extensible Markup Language messages that follow the Simple Object Access Protocol (SOAP) standard, Web Services Description Language (WDSL), Representational State Transfer (REST) constraints, and variations and evolutions thereof. An example of a service is Google Maps, a Web service or an RSS feed.

The term "component" as used herein refers to data that is retrieved in real-time from an information-providing service.

The foregoing detailed description includes many specific details. The inclusion of such detail is for the purpose of illustration only and should not be understood to limit the invention. In addition, features in one embodiment may be combined with features in other embodiments of the invention. Various changes may be made without departing from the scope of the invention as defined in the following claims.

As one example, the computer system may be a general purpose computer, or a specially programmed special purpose computer. It may be implemented as a distributed computer system rather than a single computer. Similarly, a communications link may be World Wide Web, a modem over a POTS line, and/or any other method of communicating between computers and/or users. Moreover, the processing could be controlled by a software program on one or more computer system or processors, or could even be partially or wholly implemented in hardware.

One or more displays for the system may be provided in connection with HTML display format. Although HTML is the preferred display format, it is possible to utilize alternative display formats for interacting with a user and obtaining user instructions.

The above discussion has involved particular examples. However, the principles apply equally to other examples and/or realizations. Naturally, the relevant data may differ, as appropriate.

Further, the above has been discussed in certain examples as if it is made available by a provider to a single user with a single site. The above described system, device and/or method may be used by numerous users over distributed systems, if preferred.

The above has been described in connection with example data formats, for example XML and/or proprietary or public formats. However, it may be used in connection with other data formats, structured and/or unstructured, unitary and/or distributed.

The system used herein may rely on the integration of various components including, as appropriate and/or if desired, hardware and software servers, applications software, database engines, server area networks, firewall and SSL security, production back-up systems, and/or applications interface software. The configuration may be, preferably, network-based and optionally utilizes the Internet as an exemplary primary interface with the user.

The various databases may be in, for example, a relational database format, but other standard data formats may also be used.

It should be noted that the term "computer system" used herein denotes a device sometimes referred to as a computer, laptop, personal computer, personal digital assistants, personal assignment pads, or equivalents thereof provided such units are arranged and constructed for operation with a mashup or service.

Furthermore, the communication networks of interest include those that transmit information in packets, for example, those known as packet switching networks that transmit data in the form of packets, where messages can be packetized and routed over network infrastructure devices to a destination. Such networks include, by way of example, the Internet, intranets, local area networks (LAN), wireless LANs (WLAN), wide area networks (WAN), and others, and can be supported by networking protocols such as TCP/IP (Transmission Control Protocol/Internet Protocol) and UDP/UP (Universal Datagram Protocol/Universal Protocol) and/or other protocol structures, and variants and evolutions thereof. Such networks can provide wireless communications capability and/or utilize wireline connections such as cable and/or a connector, or similar.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A computer system, comprising:
    a display interface;
    a user input device interface; and
    a processor cooperatively operable with the display interface and the user input device interface, and configured to facilitate
        displaying, via the display interface, a mashup or service,
        interacting with the user to input, via the user input device interface, an indication to take a snapshot of the mashup or service being currently displayed via the display interface, and
        storing a snapshot artifact of live data from the mashup or service at the instant the snapshot is taken.

2. The computer system of claim 1, further comprising interrogating the user to provide a reason why the snapshot was taken.

3. The computer system of claim 1, wherein
    plural mashups are displayed via the display interface, and
    the processor interacts with the user to input, via the user input device interface, a selection of one of the currently displayed mashups for the snapshot.

4. The computer system of claim 1, wherein the indication to take the snapshot is one touch of the user input device that triggers the storing of the snapshot.

5. The computer system of claim 1, further comprising interacting with the user so as to share the snapshot with another user.

6. The computer system of claim 1, further comprising scheduling a plurality of snapshots to be taken at pre-defined intervals.

7. A computer-implemented method for providing snapshots, comprising:
    displaying, at a mashup client computer via a display interface, a mashup or service,
    interacting with the user to input, at the client computer via a user input device interface, an indication to take a snapshot of the mashup or service being currently displayed via the display interface, and
    storing, at a mashup server computer, a snapshot artifact of live data from the mashup or service at the instant the snapshot is taken.

8. The method of claim 7, further comprising interrogating the user to provide a reason why the snapshot was taken.

9. The method of claim 7, wherein the indication to take the snapshot is one touch of the user input device that triggers the storing of the snapshot.

10. The method of claim 7, further comprising interacting with the user so as to share the snapshot with another user.

11. The method of claim 7, further comprising scheduling a plurality of snapshots to be taken at pre-defined intervals.

12. A computer-readable non-transitory medium comprising instructions for execution by a computer, the instructions including a computer-implemented method for providing snapshots, the instructions when executed comprising:
    displaying, via a display interface, a mashup or service,
    interacting with the user to input, via a user input device interface, an indication to take a snapshot of the mashup or service being currently displayed via the display interface, and
    storing a snapshot artifact of live data from the mashup or service at the instant the snapshot is taken.

13. The computer readable non-transitory medium of claim 12, further comprising interrogating the user to provide a reason why the snapshot was taken.

14. The computer readable non-transitory medium of claim 12, wherein plural mashups are displayed via the display interface,
  further comprising interacting with the user to input, via the user input device interface, a selection of one of the currently displayed mashups for the snapshot.

15. The computer readable non-transitory medium of claim 12, wherein the indication to take the snapshot is one touch of the user input device that triggers the storing of the snapshot.

16. The computer readable non-transitory medium of claim 12, further comprising interacting with the user so as to share the snapshot with another user.

17. The computer readable non-transitory medium of claim 12, further comprising scheduling a plurality of snapshots to be taken at pre-defined intervals.

* * * * *